Patented Jan. 1, 1924.

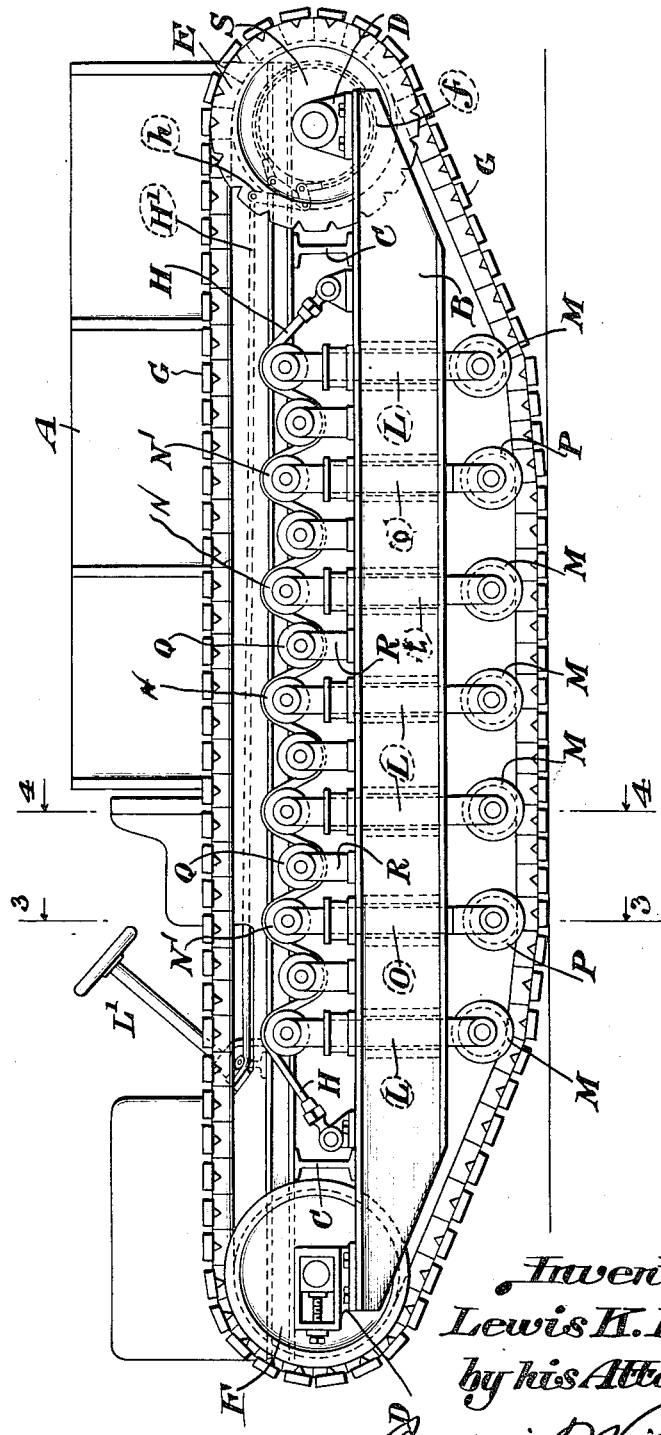

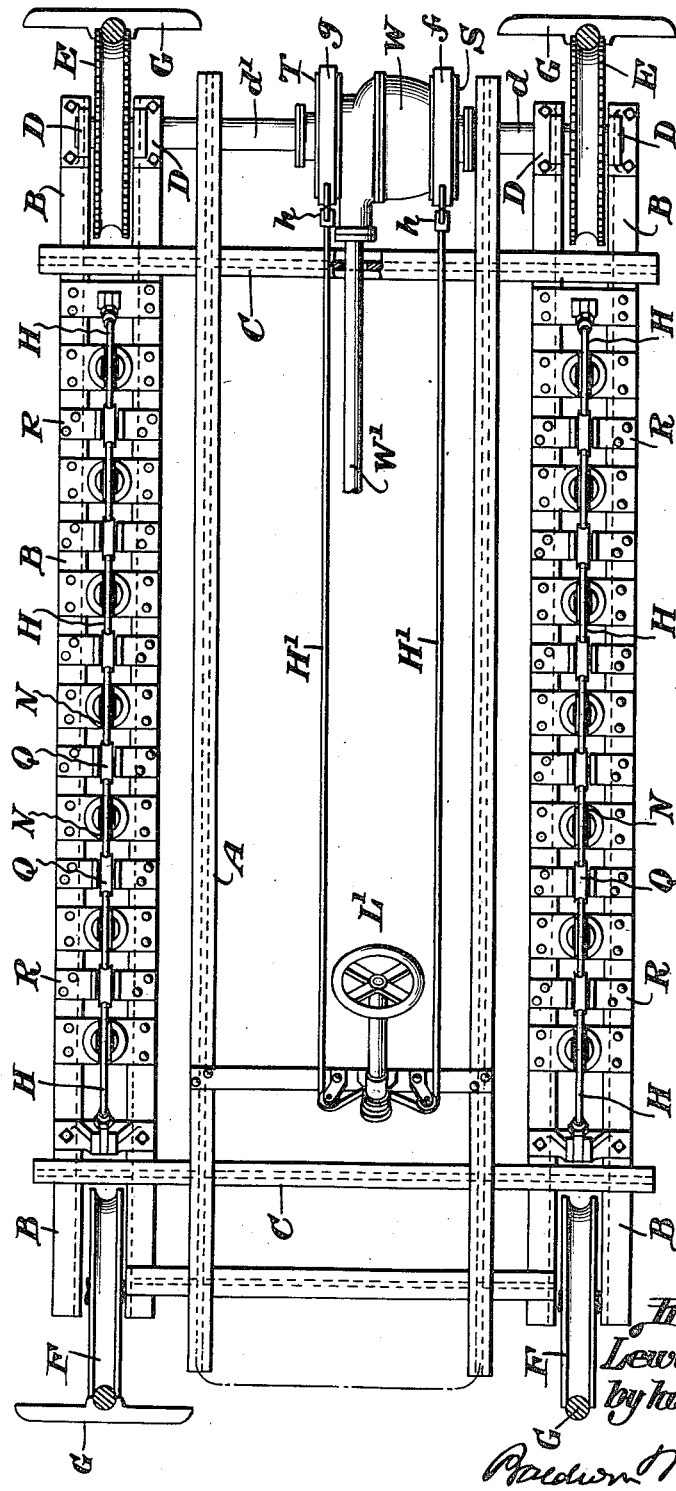

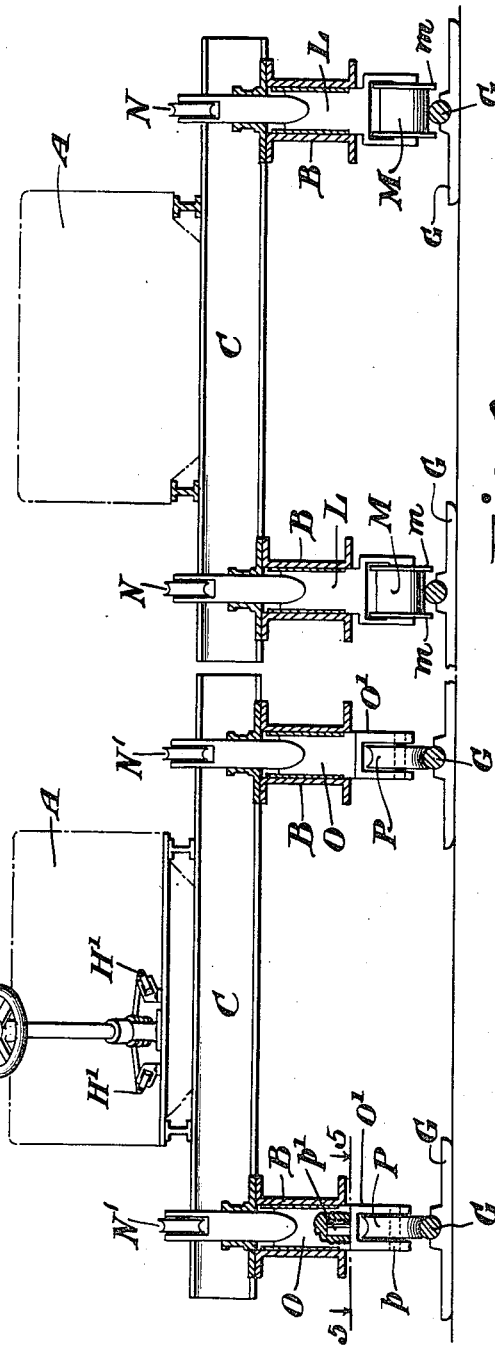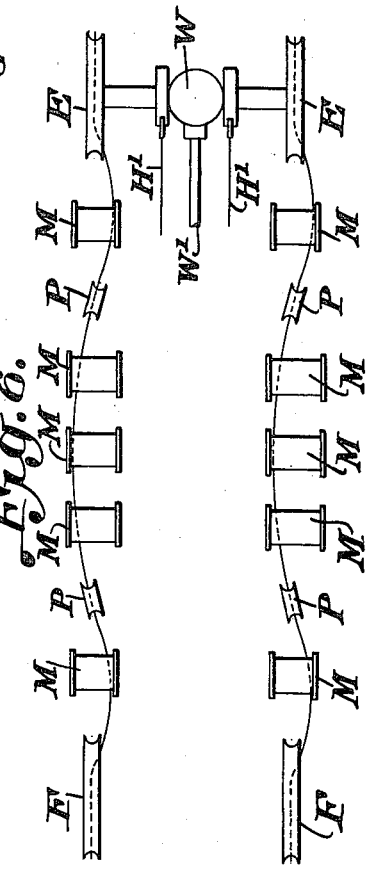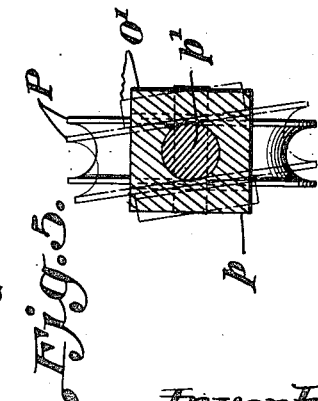

1,479,408

UNITED STATES PATENT OFFICE.

LEWIS K. DAVIS, OF WASHINGTON, DISTRICT OF COLUMBIA.

ENDLESS-TRACK VEHICLE.

Application filed March 22, 1923. Serial No. 626,800.

*To all whom it may concern:*

Be it known that I, LEWIS K. DAVIS, a citizen of the United States, residing in Washington, District of Columbia, have invented certain new and useful Improvements in Endless-Track Vehicles, of which the following is a specification.

This invention relates to motor vehicles of the class in which endless tracks or tractor belts carried by driving and idle pulleys are employed and in which the body of the vehicle is supported by wheels or rollers mounted in subframes or longerons and connected with the vehicle body.

The invention particularly relates to that class of vehicles in which the tracks or tractor belts are made laterally flexible to accommodate varying conditions of use and especially for the purpose of enabling the vehicle to be steered by bending the tracks laterally or by laying them down in a curve.

My invention may be embodied in whole track machines or half track machines and such machines have heretofore been provided with means for bending the tracks laterally for the purpose above mentioned. In some cases where the vehicle body has been supported by rollers or bogie wheels operatively connected with the vehicle body, said bogie wheels have been so mounted and supported that they may be moved laterally with the track when the latter is bent for any purpose. In order to somewhat simplify the construction, I make the supporting wheels or rollers of such width that while always in engagement with the tracks, the tracks may be bent or flexed laterally without moving the rollers sidewise. I find it advantageous to make some of the rollers relatively narrow and to have no sidewise movement, so that when the tracks are bent they are bent between said rollers and also in front and rear thereof.

In the accompanying drawings I have shown how my invention may be applied to a well known form of tractor.

Figure 1 shows a side elevation of an endless track vehicle embodying my improvements.

Figure 2 is a plan view thereof.

Figure 3 shows a section on the line 3—3 of Figure 1.

Figure 4 shows a section on the line 4—4 of Figure 1.

Figure 5 is a detailed view in section showing how some of the rollers may be mounted to have a slight pivotal movement about a vertical axis.

Figure 6 is a diagram illustrating on a somewhat exaggerated scale the shape of the rollers employed and how the tracks may be bent.

The vehicle body or chassis A is associated on each side with a subframe or longéron B. In the particular form of vehicle shown, there is an I-beam connection C between the longérons and the chassis. The longérons carry brackets D, in which the shafts of the driving pulleys E and the idle pulleys F are mounted. The tracks or tractor belts G are supported by the driven and idle pulleys in the usual way. Preferably a well known rope suspension is employed in the construction of the tractor, the chain, rope or cable being indicated at H, the opposite ends of the cable being connected to brackets on the longéron in the manner shown or any other suitable way. The shoes or sections of the tracks are connected by universal joints in any suitable manner, as for instance, in the manner shown in the Rackham Patents No. 1,434,630 of November 7, 1922, and No. 1,440,243 of Dec. 26, 1922. The chain, rope or cable on each side of the vehicle extends over pulleys N carried by vertically moving posts L, each of which carries on its lower end a track engaging roller M; the rope, chain or cable on each side also passes over two rollers N' carried on vertically moving posts O supporting the track engaging rollers P. The rollers P differ in construction from the rollers M as will hereinafter appear.

The rope, chain or cable on each side of the vehicle passes under rollers Q supported in brackets R attached to the subframe B. In this way the weight of the vehicle is carried by the cables H and this weight is transmitted to the rollers N and P in the manner now well known.

Referring to Figure 3, it will be seen that the rollers P are so mounted that they may move vertically in the subframe, but these rollers are relatively narrow and are in engagement at all times with the track. It is desirable, however, that these rollers which are called the control rollers, should have a slight movement about a vertical axis in the manner indicated in Figure 6 and for this purpose they may be mounted in the manner indicated in Figure 5, that is to say, the stub axles *p* are mounted in yokes O' which are pivotally connected with the posts O at p'. In this way the rollers P may move vertically with the posts O but they are permitted to turn about vertical axes when the tracks are bent or flexed laterally.

Referring to Figure 4 it will be seen that the rollers M are much wider than the rollers P, the tread portions included between the flanges m being sufficiently wide to allow the tracks to be bent or flexed for steering and other purposes to the desired extent, without giving a lateral movement to the rollers, which latter may, however, move vertically in the usual way. Both the wide and narrow rollers are mounted to move vertically and the latter are permitted to turn about vertical axes, but both are held against any substantial lateral movement in the preferable embodiment of the invention. The details of construction may be varied considerably without departing from the invention.

It is now known that a vehicle of the class to which my invention relates may be steered by bending the tracks laterally; such bending of the tracks may be accomplished in various ways. Preferably it is accomplished by the use of differential gearing known as controlled differential gearing of the kind shown, described and claimed in the application for patent of George John Rackham, filed Aug. 1, 1922, No. 579,043.

In Figures 1 and 2 of the accompanying drawings, each axle d, d' is provided with a suitable brake. Preferably brake drums S and T are employed associated with brake bands f, g, operated by tightening devices h actuated by wires or cables H' extending to steering mechanism L'.

By means of the organization shown the vehicle may be steered by merely applying the brake to one of the driving pulleys causing it to slow down and at the same time through the controlled differential gearing employed to speed up the pulley on the opposite side of the vehicle. The degree of increase may be adjusted to any desired extent by employing properly formed gearing members.

If the brake is applied to the brake drum S and loosened on the brake drum T, the speed of the driving pulley on the axle d will be reduced and the speed of the pulley on the axle d' will be increased, thus causing the tractor belt connected with the axle d' to increase its speed, thus causing the vehicle to turn in the manner indicated in Figure 6. When the tracks are thus flexed or bent, the control rollers P are not moved laterally out of line with the sprocket pulleys E and F, but they are turned to a small extent about vertical axes. The rollers M maintain their normal position, but in view of the wide treads of these rollers, the tracks are allowed to flex or bend laterally in the manner indicated in the diagrammatic view.

The differential gearing W may be operated by power through a shaft W' in any suitable way.

I claim as my invention:

1. An endless track vehicle comprising a vehicle body, laterally flexible tracks and body supporting devices comprising flanged track engaging rollers held against any substantial lateral movement movable vertically and connected with the vehicle body and having treads materially wider than the portions of the tracks which they engage to allow the tracks to move laterally across the treads to an extent sufficient for steering purposes without moving the rollers sidewise or laterally.

2. An endless track vehicle comprising a vehicle body, endless tracks each consisting of a series of shoes connected by universal joints and body supporting devices comprising flanged vertically movable track engaging rollers held against any substantial lateral movement connected with the vehicle body and having treads materially wider than the portions of the tracks which they engage to allow the tracks to move laterally across the treads to an extent sufficient for steering without moving the rollers sidewise or laterally.

3. An endless track vehicle comprising a vehicle body, subframes or longerons associated therewith, laterally flexible tracks, sprocket pulleys carried by the subframes for longerons over which the tracks extend and body supporting devices associated with the subframes comprising flanged track engaging rollers held against any substantial lateral movement movable vertically independently and connected with the vehicle body and having treads materially wider than the portions of the tracks which they engage to allow the tracks to move laterally across the treads to an extent sufficient for steering without moving the rollers sidewise or laterally.

4. An endless track vehicle comprising a vehicle body, laterally flexible tracks associated therewith, track engaging rollers connected with the vehicle body, some of which have treads materially wider than the portions of the tracks which they engage to allow the tracks to move laterally across the treads to an extent sufficient for steering while others of said rollers have much narrower treads permitting little or no lateral movement of the tracks sidewise on said treads, and supports for the narrower rollers mounted to turn about vertical axes.

5. An endless track vehicle comprising a vehicle body, laterally flexible tracks associated therewith, a subframe or longeron and body supporting devices in the longeron and connected with the vehicle body comprising a plurality of posts movable vertically independently and carrying track engaging rollers held against any substantial lateral movement having treads materially wider than the portions of the tracks which they engage to allow the tracks to move laterally across the treads to an extent sufficient for steering purposes without moving the rollers laterally.

6. An endless track vehicle comprising a vehicle body, laterally flexible tracks associated therewith, track engaging rollers connected with the vehicle body, some of which have treads materially wider than the portions of the tracks which they engage to allow the tracks to move laterally across the treads to an extent sufficient for steering, while others of the said rollers which are adapted to move vertically and also to turn about vertical axes have much narrower treads permitting little or no lateral movement of the tracks sidewise on said treads.

In testimony whereof, I have hereunto subscribed my name.

LEWIS K. DAVIS.